Sept. 30, 1958 R. J. KIRCHER 2,854,651

DIODE CIRCUITS

Filed June 30, 1953 7 Sheets-Sheet 1

INVENTOR
R. J. KIRCHER
BY N. S. Ewing
ATTORNEY

Sept. 30, 1958 R. J. KIRCHER 2,854,651

DIODE CIRCUITS

Filed June 30, 1953 7 Sheets-Sheet 2

INVENTOR
R. J. KIRCHER
BY
N. D. Ewing
ATTORNEY

INVENTOR
R. J. KIRCHER
BY
N. S. Ewing
ATTORNEY

Sept. 30, 1958 R. J. KIRCHER 2,854,651
DIODE CIRCUITS
Filed June 30, 1953 7 Sheets-Sheet 4

INVENTOR
R. J. KIRCHER
BY N. D. Ewing
ATTORNEY

INVENTOR
R. J. KIRCHER
BY N. S. Ewing
ATTORNEY

INVENTOR
R. J. KIRCHER
BY N. S. Ewing
ATTORNEY

INVENTOR
R. J. KIRCHER
BY
N. S. Ewing
ATTORNEY

United States Patent Office 2,854,651

Patented Sept. 30, 1958

2,854,651

DIODE CIRCUITS

Reymond J. Kircher, Summit, N. J., assignor to Bell Telephone Laboratories, Incorporated, New York, N. Y., a corporation of New York Application June 30, 1953, Serial No. 365,080

20 Claims. (Cl. 340—155)

This invention relates to electrical circuits employing p-n junction semiconductor translating devices having reverse conduction characteristics which include both a region of high resistance (low conductance) and a well-defined region of substantially constant voltage (with a relatively high conductance property).

Semiconductor devices of a type which may be employed in the practice of the present invention are described in an application of W. Shockley, Serial No. 211,212, filed Febuary 16, 1951, which issued as Patent 2,714,702 on August 2, 1955 and also in an article by G. L. Pearson and B. Sawyer entitled "Silicon P–N junction alloy diodes" which appears in the Proceedings of the I. R. E. for November 1952 at page 1348. These devices comprise an integral body of semiconductor material having two regions of opposite conductivity type material separated by a narrow zone of transition from material of one type conductivity to material of the opposite type conductivity. An electrode makes electrical connection to each of the two regions.

It has heretofore been known that two-terminal semiconductor devices of this type have asymmetrically conducting properties, i. e., they have rectifying properties, and, from the characteristic designation of conductivity type applied to semiconductors, p-type and n-type, and from the fact that these characteristic properties are believed to be due to the junction between the p- and n-type materials, they have come to be known as p–n junction diodes or rectifiers. Generally speaking, easy flow or forward conduction is possible through the junction from one conductivity type to the other for a given potential difference between the conductivity types, and hard flow or reverse conduction for the opposite potential between the conductivity types.

Among the materials more commonly used for such devices are germanium and, more recently, silicon. In the case of germanium, the useful properties of the devices to be described should not be confused with the negative resistance displayed by point-contact germanium diodes when driven sufficiently far in the reverse direction. This negative resistance arises from temperature effects, which, it is thought, is not the case with the reverse constant voltage characteristic to be described.

The above-cited Shockley patent describes a new property of p–n junction devices previously unrealized and also suggests novel circuits utilizing this new property. This property, briefly, is a region of substantially constant voltage below burnout and over a wide range of currents in the reverse conduction characteristic. Important features of this property are that the break in the reverse conduction characteristic from a very high resistance to a low alternating-current resistance, at nearly constant voltage, is very sharp and that the critical reverse voltage at which the characteristic breaks is very stable both with life and with temperature variations. Further, this critical voltage at the "knee" of the characteristic may be predicted, and, by proper design, may be obtained at any desired voltage over a range from a few volts to as high as a thousand volts. One way of designing for a particular critical voltage is by controlling the concentration gradient in the transition zone, for example, by controlling either the width of the transition zone or by controlling the inherent conductivity of the semi-conductor material employed, as by controlling the amount of impurity added to the material. Prior to the discovery and realization by Shockley of this constant voltage region in the reverse conduction characteristic, the critical voltage was so high, probably a thousand volts or more, that devices driven this far in the reverse condition would be limited by the above-mentioned thermal effects and probably burn out. Now, however, units with low critical reverse voltages may be designed, giving them wide application where such a property is useful.

It has been suggested that the abrupt change from a high resistance reverse characteristic to a low resistance substantially constant voltage characteristic is due to effects similar to those described by Zener (145 Proc. of Royal Society 523, London, 1934) for the breakdown of insulators. These devices are therefore known by some as "Zener diodes," and the critical reverse voltage is referred to as the "Zener voltage." According to another theory, the bonds which tightly hold the electrons within their crystalline structure are broken at a critical voltage gradient, releasing an avalanche of electrons to serve as current carriers. An exact or complete understanding of the theory explaining the novel properties discovered by Shockley is, however, not necessary to an understanding of the present invention.

In accordance with illustrative embodiments of the invention, there are described in more detail below circuits employing two-terminal p–n junction semiconductor devices connected in a circuit with a source of voltage for applying to the semi-conductor device reverse voltages equal to or greater than the critical reverse voltage at which the constant voltage characteristic is obtained, and means for blocking forward conduction through the p–n junction device. The latter means may comprise a second asymmetrically conducting impedance element connected in series opposition for forward currents with the p–n junction device. Although the latter device may also have a constant voltage region in its reverse characteristic, a device is chosen which has a critical voltage greater than the maximum voltage for which it is desired to block forward current flow in the first device.

By the combination just described, current flow in one direction will be substantially blocked, at least over a predetermined range of applied voltages, while conduction in the opposite direction takes place only in response to applied voltage greater than the threshold value determined by the critical back voltage of the p–n junction device. It should be noted that this conduction occurs in response to a negative voltage greater than a threshold value, thus obtaining a result generally obtainable with prior art devices only in response to positive voltages. By proper poling, however, similar results may be obtained for positive voltages.

There are also described in more detail below particular circuits wherein principles of the present invention may be employed to advantage. One of these is a four-party selective ringing circuit wherein full selectivity is obtained by the use at each substation of a p–n junction semiconductor device of the type described above in series opposition with a conventional high back resistance diode, and with this arrangement, a direct-current control voltage which may be applied to either side of the line wtih either polarity.

Circuits which form the principal subject-matter of my application Serial No. 365,081, also filed on June 30, 1953, are also described below. In these circuits, an external connection is made to the junction of a pair of oppositely poled asymmetrically conducting impedance devices, one of which comprises a p-n junction device of the type mentioned above. New degrees of freedom in establishing desired and unique transmission or impedance characteristics are obtainable by the use of such a combination in four-terminal networks—in some cases in combination with further asymmetrical devices.

A more complete understanding of the invention, including its objects and features, may be obtained by a consideration of the following detailed description when read in accordance with the attached drawings, in which.

Figure 6:
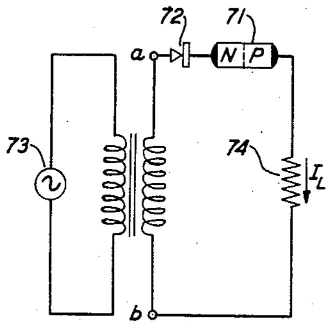
Figure 6A:
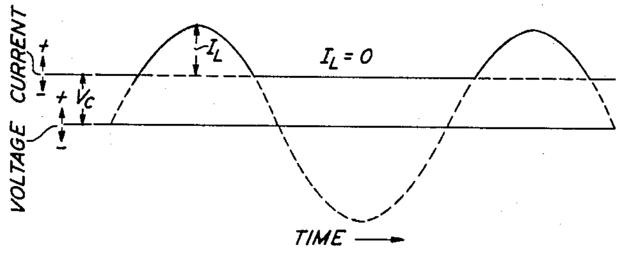
Figure 7:
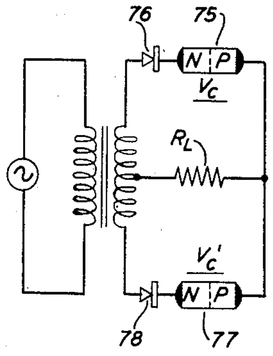
Figure 7A:
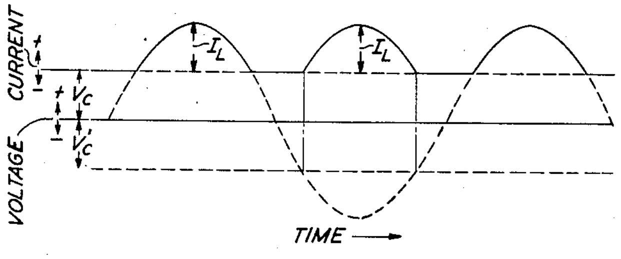
Figure 8:
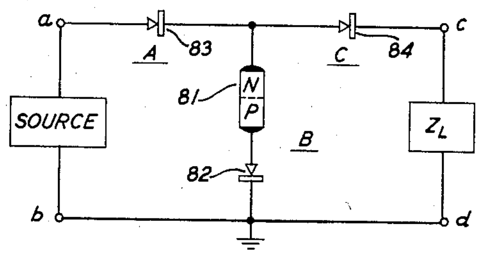
Figure 8A:
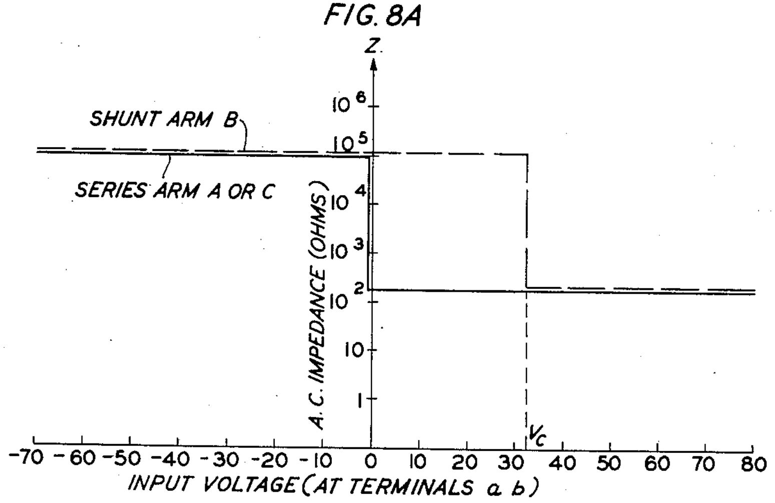
Figure 8B:
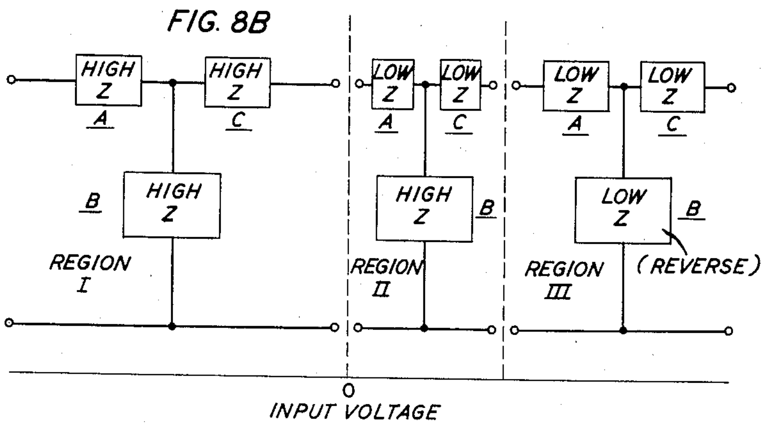
Figure 9:
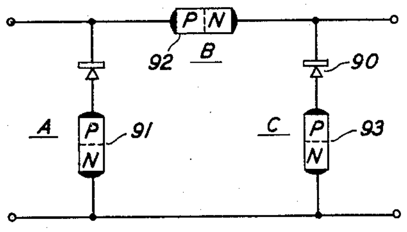
Figure 9A:
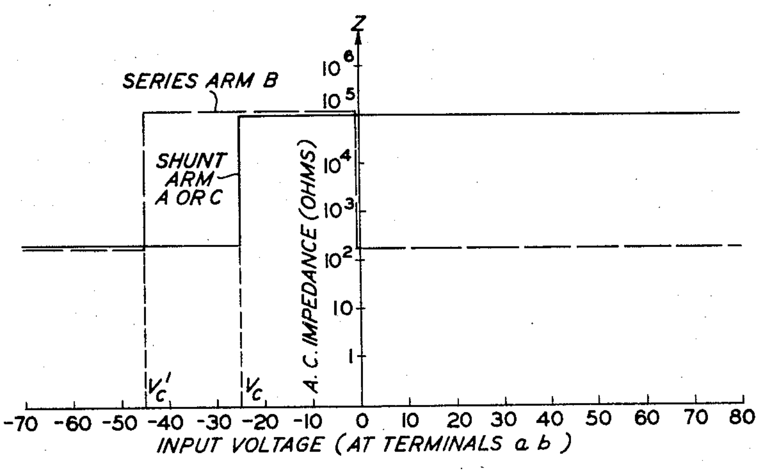
Figure 9B:
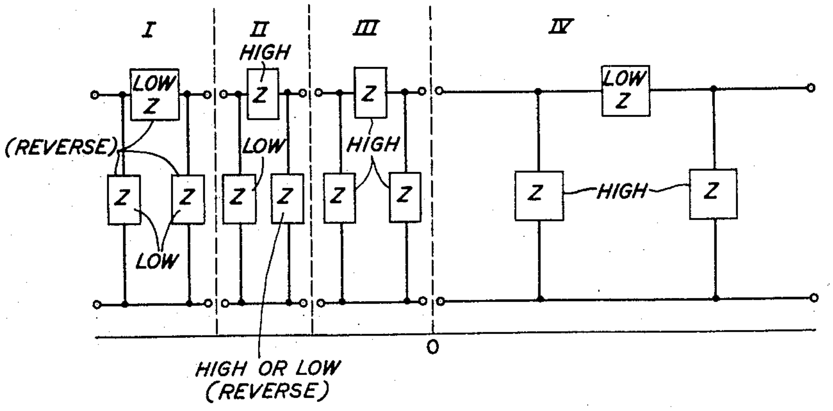
Figure 9C:
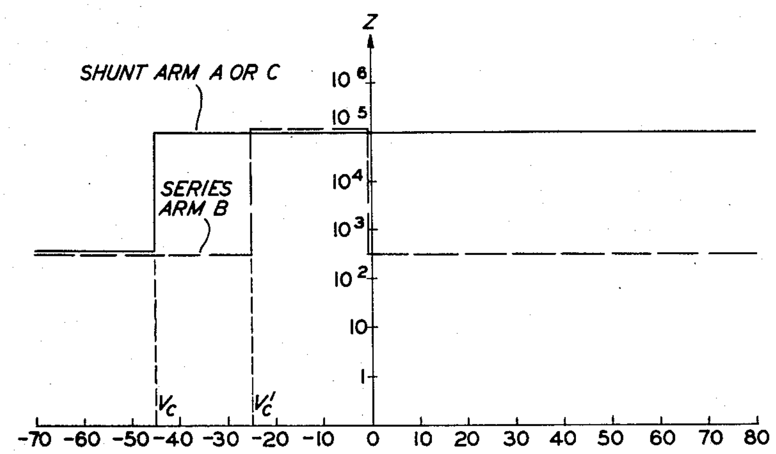
Figure 9D:
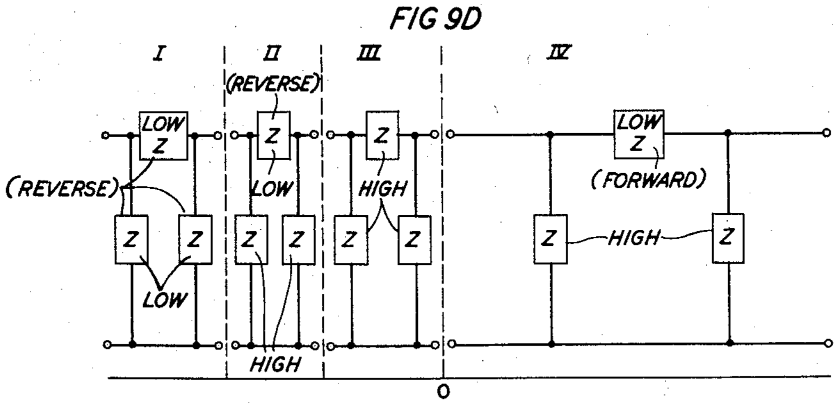
Figure 9E:
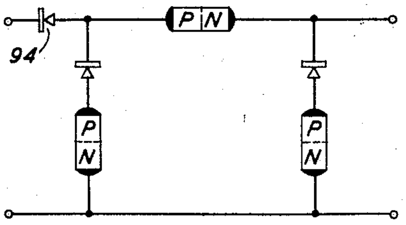

Figs. 6, 7, 8, 9, and 10 illustrate other circuits employing principles of the present invention, wherein a p-n junction semiconductor device is connected in series opposition (for forward currents) with a second asymmetrically conducting impedance element;

Figs. 6A and 7A are curve diagrams descriptive of Figs. 6 and 7, respectively;

The diagrams of Figs. 8A and 8B are descriptive of Fig. 8 and the diagrams of Figs. 9A–9E are descriptive of Fig. 9;

Fig. 9E is a modification of Fig. 9; and

Figs. 11, 12, 13, and 14 illustrate further circuits embodying principles of the present invention wherein an external connection is made to the junction of the p-n junction device and a second asymmetrically conducting impedance element.

Figure 1:
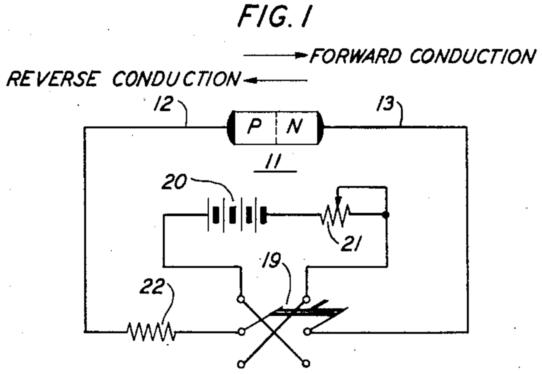
Fig. 1 represents a generalized p-n junction semiconductor device of a type described in the Shockley application mentioned above connected in a circuit for obtaining its conduction characteristic.

The semiconductor device 11 in Fig. 1 has a p-n junction formed by an integral body of semiconductor material including body sections of p and n conductivity type material, respectively. There is a thin zone at the interface of the p- and n-type body portions over which there is a progressive change or transition from the degree and type of conductivity characteristic of one body portion to the degree and type of conductivity characteristic of the other body portion. Electrodes 12 and 13 make electrical ohmic connection to the p- and n-type body portions.

The symbol employed in Fig. 1 to represent a p-n junction device is not intended to accurately represent physical structure but is merely a generalized representation illustrating generic features of such devices. Such a device may be obtained by drawing and doping of the semiconductor material.

Figure 1A:
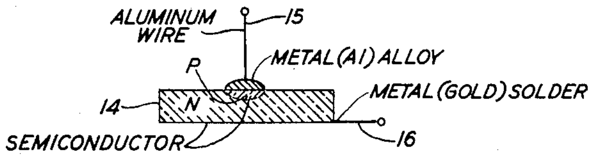
Fig. 1A illustrates a specific device of this type.

Fig. 1A shows in cross-section a representation of a second p-n junction device constructed by alloying principles but also having the desired characteristics in the reverse conduction condition. This second device comprises a homogeneous n-type silicon crystal 14 to which an aluminum electrode 15 is alloyed by heating the crystal and bringing it in contact with the aluminum. This type of device is described in more detail in an application of G. L. Pearson, Serial No. 270,370, filed February 7, 1952, which issued as Patent 2,757,324 on July 31, 1956, and also in the Pearson-Sawyer article cited above. It is believed that a p-n junction having the general configuration illustrated in the figure is formed during the cooling cycle and is situated at the interface between the unmelted silicon and the frozen-out primary solid solution. A second metallic electrode 16, which may be gold, may be arranged to make ohmic contact with the opposite face of the crystal 14. The symbol employed in Fig. 1 is used in the remaining figures to represent, generically, a device having the characteristics about to be described.

By means of the double-pole double-throw switch 19 in Fig. 1, voltages of either polarity may be applied to the p-n junction device 11 from the battery 20. By means of the variable resistance 21, the magnitude of these voltages may be varied. The resistor 22 limits current flow through the device 11 to a safe value.

Figure 2:
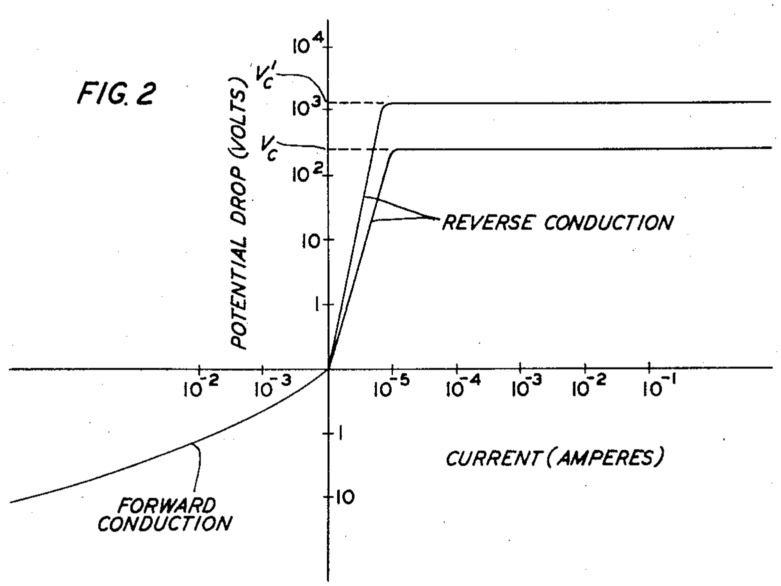
Fig. 2 illustrates conduction characteristics of several p-n junction devices obtainable by the circuit shown in Fig. 1.

Fig. 2 illustrates two typical characteristics of these devices which may be obtained by the circuit shown in Fig. 1. Both currents and voltages are on a logarithmic scale to illustrate more clearly the saturation region in the reverse conduction characteristic. Over this region, which lies between zero volts and the knees of the curves, the characteristics are those of very high resistances. In fact, had a linear current scale been employed, this region would be reduced to a vertical line and obscured by the voltage ordinate. At the critical reverse voltages $V_c$ and $V_c'$, respectively, the characteristics break sharply from a very high resistance to a low alternating-current resistance, substantially constant voltage characteristic, which extends over an appreciable range of currents and includes several decades of current variation. Although the breaks at the reverse voltages $V_c$ and $V_c'$ appear quite sharp on the scale used, it should again be noted that had a linear current scale been employed, the sharpness of these breaks would be even more striking.

The present invention utilizes the reverse characteristic just described. As mentioned above, by proper design of the p-n junction device and, more particularly, by proper control of the concentration gradient in the transition zone, a unit may be designed for any desired value of $V_c$ over a large range of values. It may be noted that the forward conduction characteristics are those of conventional p-n junction diodes and differ from each other in only a minor degree.

Figure 3:
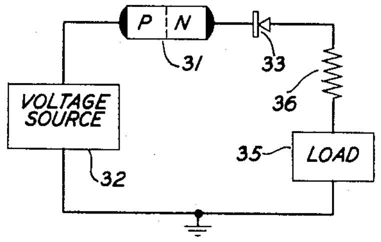
Figs. 3 and 4 illustrate by schematic diagram, two circuits embodying principles of the present invention.

In Fig. 3, in accordance with the present invention, a p-n junction semiconductor device 31 is connected in a series circuit with a source of voltage 32 and with an asymmetrically conducting impedance element 33, which may comprise a conventional diode of either the vacuum or crystal type. The latter element is connected in series opposition for forward currents with the p-n junction device, forward conduction in the p-n junction device taking place across the junction from the p-type region to the n-type region when the *n* is more negative than the *p*. Assuming the critical reverse voltage of the p-n junction device to be $V_c$, the voltage source 32 produces voltages at least intermittently greater than $V_c$. A load circuit 35 and a current limiting resistor 36 are connected in series with the p-n junction device 31 and the asymmetrically conducting impedance element 33.

For all positive voltages, i. e., voltages biasing the p-region positive with respect to the n-region, the p-n junction device will be conducting in what is described as its forward or easy flow condition but the diode 33 will be operated in its reverse or hard flow condition, thereby substantially blocking current flow from the source 32 to the load 35. For all negative voltages from *p* to *n* less than $V_c$, the p-n junction device 31 will be a very high resistance and also block current flow to the load. If the voltage across the p-n junction device 31 should exceed, in a negative sense, $-V_c$, however, the p-n junction device will be driven into its low resistance, constant voltage region, and, since the diode 33 will now operate in its forward direction, current limited primarily by the resistor 36 will flow through the load. A second similarly poled p-n junction device having substantially the same critical reverse voltage may be connected in series with the first device in which case the effective critical voltage will be substantially the sum of the two critical values.

Figure 3A:
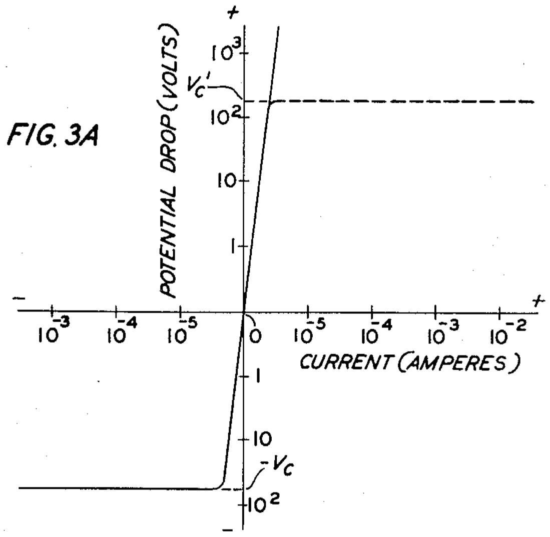
Fig. 3A is a voltage-current diagram descriptive of the circuit of Fig. 3.

The series combination of the p-n junction device 31 and the diode 33, therefore, blocks current flow in one direction and permits it in the other direction only for applied voltages which exceed a threshold value. The characteristic of this combination is illustrated by the solid line portions of the curve in Fig. 3A. A sharp transition in impedance and hence conduction is thereby obtained by elements which, practically speaking, are passive devices at a voltage other than zero, and without the use of a direct-current bias. Further, the threshold at which this transition occurs in the back voltage region, in the case considered, is a negative voltage.

In the asymmetric device 33 should also be a p-n junction device having a constant voltage region in its reverse characteristic, the second device should be chosen having a critical reverse voltage greater than the maximum positive voltage to be applied if it is desired to block all current flow in the forward direction of the first p-n junction device. If, however, it is desired that current flow through the device in response to positive voltages greater than a threshold value $V_c'$ as well as in response to negative voltages greater than $-V_c'$, the diode 33 should be replaced by a p-n junction device similar to the device 31 but having a critical reverse voltage of $-V_c'$. This latter device should also be connected in series opposition for forward currents with the first p-n junction device. With such a device, the combination characteristic will be the curve in Fig. 3A as modified by the dashed line.

Figure 4:
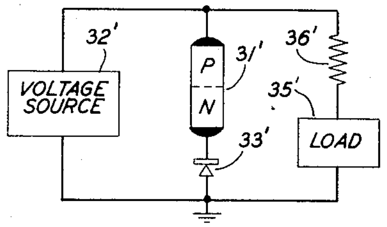

Since the load circuit 35 is connected in series with the p-n junction device 31 and the diode 33, the p-n junction device and the diode act much as a series switch, permitting current related to the injut voltage in a more or less linear fashion to flow through the load circuit when the switch is closed, i. e., when the critical reverse voltage of the p-n junction device is exceeded. If the load 35' and current limiting resistor 36' are connected in shunt with the asymmetrically conducting elements 31' and 33' as shown in Fig. 4, different characteristics are obtainable. This load circuit will draw current linearly related to the input voltage from the source for all positive voltages, which bias the diode 33' in its high resistance condition, and for negative voltages below the critical reverse voltage of the p-n junction device 31, which similarly bias the latter device. For negative voltages greater than this critical value, the p-n junction device 31' limits the voltage applied to the load and the series resistor to a value approximately equal to its critical reverse voltage since the diode 33' is a very low resistance under this condition. The particular connection employed will depend on the impedance of the load as well as on the conduction characteristic desired.

Figure 5:
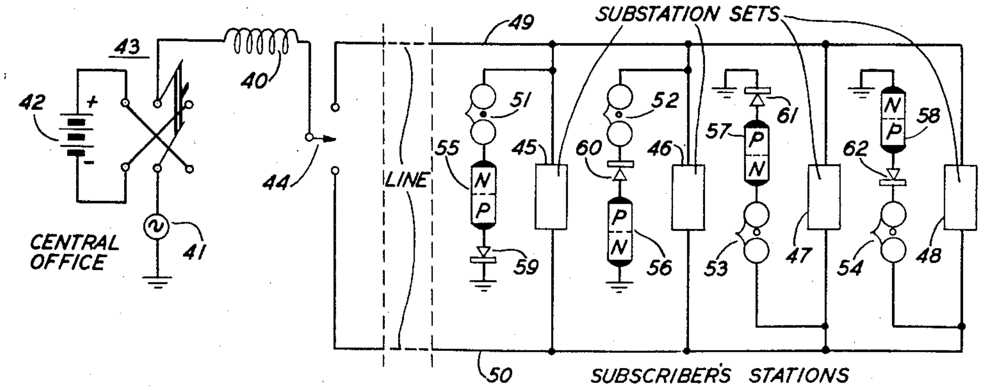
Fig. 5 illustrates a fully selective four-party ringing circuit employing principles of the present invention.

Fig. 5 illustrates a fully selective four-party ringing circuit. Twenty-cycle ringing current of ±90 volts, R. M. S., is provided by the generator 41, one side of which is grounded. Superimposed on the ringing current is a direct-current bias provided by the central office voltage supply comprising the battery 42, the polarity of which may be reversed by means of the double-pole double-throw switch 43.

By means of the single-pole double-throw switch 44, the alternating ringing current and direct-current bias may be applied through the trip relay 40 to either side of the line with respect to ground.

Substation sets 45–48 of the four subscribers, including conventional telephone transmitters and receivers, are connected across the two-wire line 49–50, neither side of which is grounded. Each of the sets is provided with a conventional ringer connected betwee one side of the line and ground. Two of the ringers, 51 and 52, are connected to one side of the line 49 and two, 53 and 54, to the other side 50. The substation sets are, of course, open circuit when ringing current is applied; this expedient is well known in the telephone art and is not illustrated in the drawings.

In series withe each ringer are a p-n junction semiconductor device of the type described above, devices 55–58, respectively, and a conventional high back resistance diode, devices 59–62, respectively, connected in series opposition for forward currents. Partially selective ringing is obtained by connecting two ringers to one side of the line and two to the other and by applying ringing current to either side of the line with respect to ground. Full selectivity is obtained by reversing with respect to each other the poling of the p-n junction devices connected to the same side of the line and by applying a bias with either polarity to either line.

To more clearly illustrate the operation of this selective ringing circuit, specific values will be assigned to certain of the parameters involved. The p-n junction devices 55–58 are assumed to have approximately the same critical reverse voltage of −70 volts at which their characteristics break from high resistance to low resistance constant voltage. Battery 42 is assumed to have a terminal voltage of 48 volts, nominal, and the terminal voltage of the 20-cycle ringing source 41 is ±90 volts R. M. S. Further, each ringer has an effective series resistance of 20,000 ohms and requires 3 milliamperes to operate. Line losses will be neglected.

Assume now that +48 volts ±90 volts R. M. S. are applied to conductor 49 with respect to ground. The instantaneous voltage on conductor 49 will swing from a +175 volt positive peak to a −79 volt negative peak and, subtracting the drop across the ringers, this leaves an effective voltage swing of +115 volts to −19 volts to break down the p-n junction devices. Ringers 53 and 54 will be unaffected since connected between line 50 and ground. Ringer 52 will also remain unoperated since on the positive swings, diode 60 blocks current and the negative peaks are insufficient to drive device 56 into its constant-voltage reverse conduction condition. Ringer 51, however, will be energized since the device 55 will "break down," i. e., be driven into its constant voltage region by the positive swings. (With a 60-volt drop across the ringer 51, 48 volts of which are supplied by the direct-current bias, device 55 will be a low impedance for the major portion of the positive swings.)

By reversing switch 43, −48 volts ±90 volts R. M. S. will be applied to line 49 which will now swing from a positive peak of +79 volts to a negative peak of −175 volts, and ringer 52 will be energized during the major portion of the negative swings.

By reversing switch 44, either +48 volts ±90 volts R. M. S., or, −48 volts ±90 volts R. M. S. may be applied to the lower line and either ringer 53 or 54, respectively, may thus be selectively energized to the exclusion of the other ringers. In summary, by applying ±48 volts and the 90 volts R. M. S. ringing current to either metallic conductor with respect to ground, the selective ringing of either of two ringing devices may be accomplished, thus obtaining four-party selective ringing.

The ringing circuit just described is similar in some respects to selective ringing circuits of the type described in L. J. Stacey Patent 2,088,311, dated July 27, 1937, which employed gas tubes. The circuit described above has many advantages over those employing gas tubes. For example, p-n junction devices may be designed for critical reverse voltages over a much wider range than the range of firing voltages available with gas tubes. Further, this critical voltage may be held within a much smaller tolerance of a specified value than the firing voltage of gas tubes; this simplifies design of longer loop circuits since a relatively small percentage of the central office ringing supply voltage need be assigned to compensate for variations in the critical breakdown voltage and a larger percentage is reliably available to compensate for line loss. Ringer design also is simplified by the tolerance improvement since the voltage impressed on the ringer is the difference between the central office supply supply voltage and the voltage drop across the ringing control elements (elements 55—62) modified by loop and line leakage losses. These devices are also very stable with variations in temperature and have the more obvious advantages of ruggedness, compactness, and long life.

The circuit of Fig. 6 and the associated wave form shown in Fig. 6A illustrate a use of the series combination of a p-n junction semiconductor device 71 of the type described above and an opposed high back resistance diode 72 in a half-wave rectifier type circuit. Negative input signals from source 73, i. e., those which make terminal *a* negative with respect to terminal *b* will not be transmitted by the conventional diode 72 which will be biased for such signals in its reverse condition. Positive input signals below the critical back voltage $V_c$ of the p-n junction device 71 will be blocked by the latter device, and substantial conduction through the load resistor will occur only if the input signals are positive and if they exceed the critical back voltage of the p-n junction device. Transmission will be fairly linear when the combination is conducting.

The solid line portions of the curve in Fig. 6A indicate the output current through resistor 74 and the dotted line the input voltage. If both the diode 72 and the p-n junction device 71 are reversed, similar effects will result on the negative input peaks.

In Fig. 7, two pair of opposed devices 75—76 and 77—78 are connected in a full-wave rectifier type circuit. An illustrative output current wave form is shown in Fig. 7A. The addition of the second pair of opposed devices 77—78 permits transmission in response to negative signals which exceed the critical reverse voltage $V_c'$ of the second p-n junction device. Conduction in the load resistor $R_L$ is unidirectional and for limited periods. Circuits of the type shown in Figs. 6 and 7 may be employed to count the occurrences of voltages greater than a specified amount, for example, in impulse noise counting circuits or to prevent transmission of voltages less than a specified amount, for example, in pulse transmission circuits where it is desired to transmit only pulses which originate as signals and not those which result from noise.

The circuits thus far described illustrate new degrees of transmission control which become available by the use of a p-n junction device having reverse characteristics as described above in series opposition, for forward currents, with a second asymmetrically conducting element which may or may not have a constant voltage region in its reverse characteristic. Further illustrations follow.

In Fig. 8, the combination of a p-n junction device 81 having a predetermined critical reverse voltage connected in series opposition for forward currents with a conventional diode 82 is employed in a four-terminal T-network. A pair of conventional similarly poled diodes 83 and 84 comprise the series arms of the T-network. The base of the T is grounded to provide a reference. This four-terminal network functions as a clipper, as may be seen by examining the conducting condition of the various asymmetrical elements in response to positive and negative input voltages. Positive input signals below the critical reverse voltage of the p-n junction device will be transmitted with little loss; for such signals, the series arms will be low impedances and the shunt arm a high impedance. If the positive input signal should exceed the critical reverse voltage of the p-n junction device, the p-n junction device will be driven into its constant voltage region in its reverse characteristic and reduce the shunt impedance of the T-network so as to clip the positive input signals at a level substantially equal to the critical reverse voltage of the p-n junction device. In response to negative input signals, the network presents a high impedance to the signal source. Some attenuation occurs since the series diodes present a high series impedance and the shunt arm is also a high impedance, namely, that of the high back resistance of the shunt diode 82. By omitting diode 82 (see Fig. 13), a more effective attenuation of negative input signals will result.

The diagrams in Figs. 8A and 8B are useful in analyzing this circuit, similar diagrams may be employed to investigate the remaining circuits and thereby gain a more complete understanding of them and their possibilities.

In Fig. 8A, the alternating-current impedance of each arm, on a logarithmic scale, is plotted as a function of applied voltage, positive and negative referring to the potential at terminal *a* with reference to terminal *b*. Series arms A and C have the characteristics of a conventional diode, while the shunt arm B shows a sharp break from a high to a low impedance, not at zero volts, but at a positive voltage $V_c$, the critical reverse voltage of the p-n junction device.

A pictorial representation of the effective impedance contributed by each arm in each of the voltage ranges of interest is given in Fig. 8B. Each diagram is located under the region of Fig. 8A which it illustrates. Since the impedance of each arm is either on the order of hundreds of thousands of ohms or merely hundreds of ohms with sharp transitions from one to the other, these impedances may conveniently be thought of as merely "high" or "low." To emphasize the degrees of freedom obtainable by the novel combination shown, the diagrams also indicate those low impedances which result from p-n junction device operating in the low incremental resistance, constant voltage region of its reverse characteristic by designating such impedances "low (reverse) Z." Without element 81, there would be only two unique combinations of high and low impedances. With this element, a third unique combination is added.

These diagrams are useful in determining the transmission characteristics of the network with various terminations across terminals *c*, *d*. For example, consider a "high" impedance termination on the order of hundreds of thousands of ohms, that is, on the order of the "high" impedances in the network itself. In region I, arms A and C of the network will, together with the load, act as a voltage divider, and the voltage across the load will be roughly (for $Z_B \gg Z_L + Z_C$)

$$\left[\frac{Z_L}{Z_L+Z_A+Z_C}\right]E_s$$

where $Z_L$, $Z_A$, and $Z_C$ are, respectively, the impedances of the load, arm A, and arm C; and $E_s$ is the voltage applied to terminals *a* and *b*. In region II, the transmission to the load will increase considerably and the voltage across the load will be approximately $E_s$. In region III, the low shunt impedance of arm B will effect considerable attenuation. In summary, therefore, with a "high" impedance termination at terminals *c*, *d*, input signals in the ranges of regions I and III will be considerably attenuated with respect to signals lying within region II.

Now consider a "low" load impedance. Attenuation will be greater in region I than was the case with a high load impedance. In region II, the attenuation will be lower than in region I but somewhat higher than with a high load impedance since in the case of a low load impedance, the series arms A and C will have a relatively greater effect in the circuit than with a high load impedance. The attenuation will be markedly greater in region III than in region II but less than with a high load impedance.

It may be noted that a high impedance is maintained at both input and output terminals regardless of the termination for all voltages below $+V_c$, dropping to a relatively low value for larger positive input voltages.

The circuit of Fig. 9, a $\pi$-network, illustrates further degrees of variation in network transmission characteristics obtainable by the combination of a p-n junction semiconductor device, having the reverse characteristics described above, and opposed conventional diode. In this circuit, such a combination is connected in each of the shunt arms A and C, and the series arm B comprises a third p-n junction device also having the unique characteristic illustrated in Fig. 2. The input shunt arm A will present a high impedance until a value of input voltage predetermined by the critical back resistance of the p-n junction device 91 is applied in response to which the impedance of this arm will be greatly reduced. Series transmission may, by design, be taking place through the series device 92 well below this value by selecting a device for this arm which has a lower critical reverse voltage. The conduction point for the output shunt arm may be made equal to, greater than, or less than that of the input arm with a corresponding modification of the network transmission characteristics.

The method of analysis applied to Fig. 8 may also be applied to Fig. 9 even though in Fig. 9 there are three "variables," namely, the critical reverse voltage of each of the p-n junction devices 91, 92, and 93. The presence of additional variables merely requires additional diagrams to investigate the characteristics under the various possible conditions. To simplify presentation, the shunt devices 91 and 93 will be assumed to have equal critical reverse voltages $V_c$. In Figs. 9A and 9B, the series p-n junction device 92 has a critical reverse voltage $V_c'$ greater than $V_c$. The characteristics of the individual arms are shown in Fig. 9A, and diagrams illustrating the effective impedances of the various arms are shown in Fig. 9B.

In region II of Fig. 9B, whether or not arm C is a high or low impedance will depend on its critical reverse voltage and on the magnitude of the high impedance of arm B. This results since arm C will be a low impedance only if the voltage across this arm exceeds, in a negative sense, the reverse critical voltage of the p-n junction device 93. Therefore, the impedance of arm B may be high enough to drop the voltage across arm C to a value insufficient to maintain device 93 in its reverse constant voltage condition, so that this arm will also be a high impedance.

If a high load impedance is connected across the output terminals *c*, *d*, the network will effect high attenuation in region I due to the low shunt impedance of arm C. If in region II arm C becomes a high impedance, the attenuation will decrease, but if it is maintained at a low value, attenuation will increase to an even greater value than in region I. A voltage divider effect is obtained in region III, the voltage across the load being approximately $$\left[\frac{Z_L}{Z_L+Z_B}\right]E_s$$

where $E_s$ is, again, the input voltage. The attenuation in region IV will be relatively low, in fact markedly lower than in any of the other three regions.

Similar effects can be obtained with a low terminating load impedance, although the attenuation in each case will be somewhat different than with a high load impedance.

Input and output impedances will be low for either type of termination for all negative voltages greater than $V_c$ and high for all positive voltages and for all negative voltages less than $V_c$.

To illustrate the variations possible by selection of devices having particular critical reverse voltages, Figs. 9C and 9D illustrate the condition where the $V_c'$ of the series device 92 is less in magnitude than the $V_c$ of the shunt devices. This results in a marked change in the transmission characteristic, giving rise to an easy transmission condition for negative voltages over a sharply defined, limited range $V_c$ to $V_c'$ in addition to the easy transmission condition for all positive input voltages. This may be seen from an inspection of the diagram in Fig. 9D.

Inspecting this diagram, it may be seen that the network in region II will have a low series impedance and high shunt impedances, giving rise to the easy transmission region just mentioned. Regions I and III bounding this region are the same as in Fig. 9B and will effect considerable attenuation relative to region II. This suggests possible uses in pulse coding where it is desired to transmit pulses lying within one or more discrete ranges. This circuit defines several discrete ranges without the necessity of direct-current biases and by inherently passive elements. The easy transmission region for a range of negative voltages also suggests the use of such a circuit as a slicer, by a slight modification illustrated in Fig. 9E. The easy transmission condition for positive voltages is wiped out by the addition of the series diode 94. Thus, the circuit shown in Fig. 9E will transmit with minimum loss only voltages lying within the discrete range $-V_c$ to $-V_c'$.

As another modification, diode 90 may be omitted to give the circuit a low output impedance in region IV.

Figure 10:
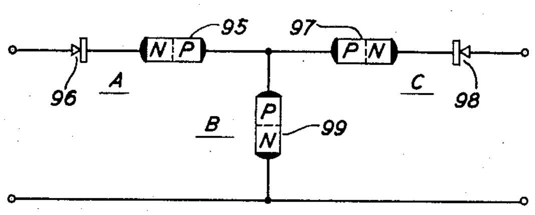

Another network configuration having unique characteristics is shown in Fig. 10. The series arms A and C of this T-network each include a p-n junction device and an oppositely poled conventional diode, 95—96 and 97—98. The devices in the two series arms are also oppositely poled with respect to each other. The shunt arm comprises a third p-n junction device 99. By the use of diagrams similar to those in Figs. 8A–8C, 9A–9F, it may be seen that this network presents a high attenuation to all input signals. Various combinations of high and low input and output impedance may be obtained by proper selection of the p-n junction devices. For example, if all three devices have equal critical reverse voltages $V_c$, the input impedance will be high for all negative voltages and for positive voltages less than $V_c$; and the output impedance will be high for all positive voltages for all negative voltages less than $-V_c$.

Figure 11:
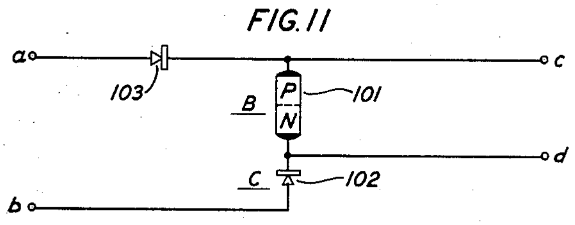

The remaining circuits are the claimed subject-matter of my copending application identified above, and illustrate four-terminal networks including p-n junction semiconductor devices and conventional high back resistance diodes which are in series opposition for forward currents with respect to a common connection and which have an external connection made to the junction of the two devices. A pair of such devices 101 and 102 are shown in Fig. 11 with one of the output terminals, *d*, connected to their junction *p*. A third asymmetrically conducting impedance element comprising a second conventional diode 103 is connected in series with one of the input terminals, *a*. For negative input signals, i. e., signals which make terminal *a* negative with respect to terminal *b*, the diode 103 and the p-n junction device 101 are biased in their high resistance reverse conduction condition while the diode 102 is biased in its forward, easy conduction, state. The voltage appearing across output terminals *c* and *d* is therefore substantially proportional to the ratio of the high reverse resistance of the p-n junction device 101 to the sum of the reverse resistance of the diode 103 and the high reverse resistance of the p-n junction device 101. If the voltage across the p-n junction device should become equal to or exceed its critical reverse voltage, the voltage across this device becomes substantially constant and any further increase in voltage between input terminals *a* and *b* appears across the diode. Since the alternating-current impedance of the p-n junction device is very low in the constant voltage conduction condition, a relatively low alternating-current impedance is produced across the output terminals *c* and *d* for the condition just described. This impedance changes to a very high value when the voltage across the p-n junction device 101 is less than its critical reverse value. Potential variations at input terminals *a* and *b* can therefore produce very sharp and very large alternating-current impedance variations across the output terminals *c* and *d*. When the polarity of the input voltage is reversed, i. e., when terminal *a* becomes positive with respect to terminal *b*, both the diode 103 and the p-n junction device 101 are biased in the easy flow condition and the diode 102 is in its high resistance reverse condition and a high impedance is maintained across the input terminals, while a low impedance is placed across the output terminals. Other features of interest may be seen upon further examination, for example, with the aid of impedance characteristics, as described above.

Figure 12:
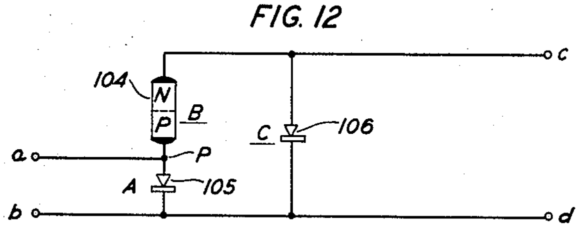

Fig. 12 illustrates another circuit utilizing the combination of a p–n junction semiconductor device 104 and a conventional diode 105 oppositely poled for forward currents with respect to a common connection *p*. In Fig. 12, one of the input terminals, *a*, is connected to this common connection. This circuit is essentially a $\pi$-network and for negative input signals less than the critical reverse voltage of the p–n junction device 104, appreciable loss occurs in transmission through the network while a high impedance is maintained at input and output terminals by the shunt diodes 105 and 106. At a larger negative signal voltage of the same polarity, the magnitude being determined by the critical reverse voltage of the p–n junction device 104, the latter device will be driven into its constant voltage condition, thereby permitting transmission through the network with much less loss. This circuit may therefore be classified as a gate. On reversing the input signal polarity, the network attenuates the input signal and presents a low input shunt impedance since all devices 104–106 will be biased in the easy flow condition by a positive input signal.

Figure 13:
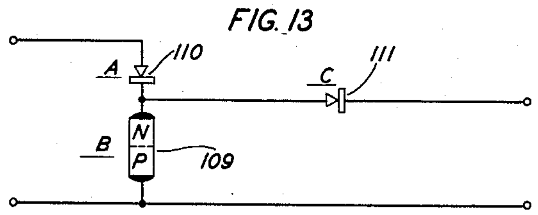

Fig. 13 illustrates another modification in the form of a T-network. Circuitwise, this circuit is similar to that of Fig. 8 with the difference that the shunt diode 82 in Fig. 8 is omitted in Fig. 13. Positive input signals less than the critical reverse voltage of the p–n junction device 109 will be transmitted with little loss through the series diodes 110 and 111. If this critical voltage is exceeded, the conductivity of the p–n junction device in its constant voltage condition will effect a marked limiting or clipping of the input signal. In response to negative input signals, the network presents a high impedance to the signal source and high attenuation results since the series diodes 110 and 111 are in their high resistance reverse condition and the p–n junction device 109 is a low shunt impedance.

Figure 14:
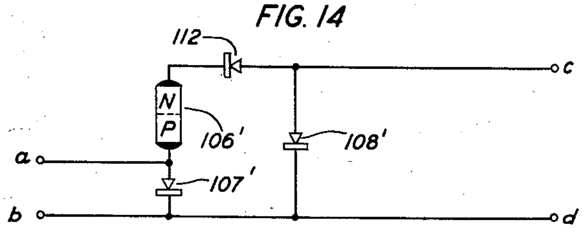

Fig. 14 is similar to Fig. 12 with the exception that a diode 112 has been interposed between the p–n junction device 106′ and the output terminal *c*. This diode modifies the transmission characteristic of the Fig. 12 circuit in that for all positive voltages, the network will comprise substantially a series resistance equal to the high reverse resistance of the diode 112 shunted by the low forward resistance of both the diodes 107′ and 108′. For positive voltages, the network, therefore, acts as a shorting switch for a load connected across the output terminals *c*, *d*. For negative voltages less than the critical reverse resistance of the p–n junction device 106′, the series arm 106′—112 as well as the shunt arms 107′ and 108′ will be high impedances. For negative voltages greater than the critical reverse voltage of the p–n junction device, the series arm will be a low impedance and since the shunt arms remain high impedances, easy transmission from the input to the output will be possible.

No attempt has been made to exhaust all possible uses of the combination of a p–n junction semiconductor device of the type described above and a conventional diode which is oppositely poled for forward currents with respect to the p–n junction device. The circuits herein described have been selected merely to illustrate the possible degrees of freedom obtainable with this combination in various types of networks. In many of the circuits described, for example, the poling of each of the diodes may be reversed to obtain similar characteristics for opposite polarities of applied voltages. Many other modifications and embodiments will be readily obvious to one skilled in the art so that the invention should not be deemed limited to the embodiments specifically described above.

In all configurations using the p–n junction device, the assumption is made that they are shielded from the effects of illumination. In certain instances, the effect of illuminating the p–n junction may be desired, in which case suitable provision for doing this may be made.

What is claimed is:

1. An electrical circuit comprising a voltage source and a two-terminal semiconductor translating device connected in series with an asymmetrically conducting impedance element, said translating device comprising a body of semiconductor material having two zones of opposite conductivity type material joined by a region of transition in conductivity type and means connecting each of said two terminals to one of said two zones, said device having a forward low resistance conducting direction from a first of said terminals to the other and a reverse conduction characteristic in the opposite direction including a region of high resistance for applied reverse voltages below a critical value and a region of constant voltage for applied reverse voltage greater than said critical value, said asymmetrically conducting impedance element also having a forward low resistance conducting direction, which direction opposes the said low resistance conducting direction of said semiconductor translating device, and means comprising said voltage source for applying to said semiconductor device reverse voltages including values both greater than and less than said critical value.

2. The combination in accordance with claim 1 wherein said semiconductor material comprises silicon.

3. The combination in accordance with claim 1 wherein said semiconductor material comprises germanium.

4. In combination, a two-terminal p–n junction semiconductor translating device and a two-terminal asymmetrical impedance element each having a low resistance forward conducting direction, means connecting said translating device and said asymmetrical element directly in series with their forward conducting directions opposing each other, said translating device having a high resistance reverse conduction characteristic for reverse voltages below a critical value and a substantially constant voltage characteristic for reverse voltages above said critical value, and means for applying to the series combinations of said translating device and said impedance element voltages including values both greater than and less than said critical value.

5. In combination, an electrical circuit including a source of voltages of both polarities, means for blocking current flow in one direction in said circuit, and means for blocking current flow in the opposite direction only for voltages from said source below a critical value comprising a two-terminal p-n junction device connected in series with said first-named means, the two-terminal characteristic of said p-n junction device having a low resistance characteristic for voltages of one polarity, a high resistance characteristic for applied voltages of the opposite polarity below said critical value, and a constant voltage characteristic for applied voltages of said opposite polarity which exceed said critical value, and said p-n junction poled to present said high resistance characteristic to currents flowing in said opposite direction.

6. The combination in accordance with claim 5 wherein said first-named means comprises a two-terminal asymmetrically conducting impedance element connected in series with said circuit and presenting a high impedance to currents flowing in said one direction and a low impedance to currents flowing in the said opposite direction.

7. The combination in accordance with claim 5 and a current operated device connected in series with said first-named means and said p-n junction.

8. The combination in accordance with claim 5 and a current operated device connected in shunt with said first-named means and said p-n junction.

9. In combination, a plurality of current operated devices connected in parallel and means for selectively applying current to one only of said devices comprising a voltage source, means for applying voltage from said source to said parallel connected devices with either polarity, and current control means connected in series with each of said devices each comprising a pair of asymmetrically conducting impedance elements connected in series opposition for forward currents, one element of each pair comprising a two-terminal p-n junction semiconductor impedance element having a substantially constant voltage region in its reverse conduction characteristic.

10. The combination in accordance with claim 9 wherein said plurality comprises at least four and wherein at least two of said p-n junction semiconductor elements are poled oppositely to the poling of at least two other of said p-n junction semiconductor elements.

11. The combination in accordance with claim 9 wherein said voltage source comprises means for applying to said parallel connected devices voltages equal to at least the value at which each of said p-n junction semiconductor elements has a constant voltage region in its reverse characteristic.

12. A T-network having an input and an output between which are connected a pair of series arms and a shunt arm, each of said series arms including an asymmetrically conducting impedance element, said asymmetrical impedance elements being similarly poled, and said shunt arm including a pair of asymmetrical impedance elements connected in series opposition for forward currents, at least one element of said pair of asymmetrical impedance elements comprising a two-terminal p-n junction semiconductor translating element having a substantially constant voltage region in its reverse conduction characteristic.

13. The combination in accordance with claim 12 and a source of voltage of a value at least equal to the value of said constant voltage and means for applying voltages including voltages of said first-named value from said source to said input.

14. A four-terminal network having input and output terminals between which are connected a series arm intermediate two shunt arms, a first asymmetrically conducting impedance element connected in said series arm, a pair of asymmetrical impedance elements connected in series opposition, for forward currents, in each of said shunt arms, said first element and one of the elements of each of said pairs comprising a two-terminal semiconductor translating element having both *p* and *n* conductivity type regions and having a reverse conduction characteristic including a region of high resistance for reverse voltages less than a critical value and a region of substantially constant voltage over a substantial range of currents for reverse voltages greater than said critical value.

15. A four-terminal network having a pair of input terminals and a pair of output terminals, a first pair of asymmetrically conducting impedance elements connected in series opposition, for forward currents, between one of said input terminals and one of said output terminals, a second pair of asymmetrically conducting impedance elements connected in series opposition, for forward currents, between the other input and output terminals, one impedance element of said first pair of elements and one impedance element of said second pair of elements each comprising a p-n junction semiconductor translating element having a high resistance reverse characteristic over a range of applied voltages of values less than a critical value and a substantially constant voltage characteristic for applied voltages of values greater than said critical value.

16. A four-terminal network having a pair of input terminals and a pair of output terminals, a first arm connected in series between said input and output terminals, a second arm connected in a shunt relation with said first arm, one of said arms including a first asymmetrically conducting impedance element and the other of said arms including a pair of asymmetrically conducting impedance elements connected in series opposition for forward currents, one of the impedance elements of said pair of elements comprising a p-n junction semiconductor translating device having a low resistance forward conduction characteristic and a high resistance reverse conduction characteristic for applied voltages less than a predetermined voltage and a substantially constant voltage characteristic for applied voltages greater than said predetermined voltage.

17. A circuit comprising an asymmetrically conducting impedance element connected in series opposition, for forward currents, with a p-n junction device; and a source of voltage at least intermittently greater than the critical reverse voltage of said p-n junction device.

18. In a communication system serving a plurality of parties and comprising a central office and a two-wire transmission line interconnecting said central office and said parties, communication means for each of said parties connected across said transmission line and selective signaling means comprising signal indicating means for each of said parties connected between one wire of said line and a point of ground potential, a p–n junction semiconductor device and an asymmetrically conducting impedance element connected in series with each of said signal indicating means, said p–n junctions and said asymmetrically conducting impedance elements being connected in series opposition for forward currents, said p–n junction semiconductor devices each having a reverse conduction characteristic including a region of low conduction for applied voltages less than a critical reverse voltage and a region of high conduction for applied voltages greater than said critical voltage and means for applying signaling voltages of either polarity between either wire of said line and ground.

19. The combination in accordance with claim 18 wherein said system serves four parties and wherein the signal indicating means of two of said parties are connected between one wire of said line and a point of ground potential and wherein the signal indicating means of the other two parties are connected between the other wire of said line and a point of ground potential.

20. The combination in accordance with claim 19 wherein the p–n junctions associated with each of said lines are oppositely poled with respect to each other.

References Cited in the file of this patent

UNITED STATES PATENTS

| | | |
|---|---|---|
| 2,570,978 | Pfann | Oct. 9, 1951 |
| 2,612,567 | Stuetzer | Sept. 30, 1952 |
| 2,629,834 | Trent | Feb. 24, 1953 |
| 2,644,896 | Lo | July 7, 1953 |
| 2,658,142 | St. John | Nov. 3, 1953 |
| 2,714,702 | Shockley | Aug. 2, 1955 |

OTHER REFERENCES

The Transistor, prepared by Bell Telephone Laboratories, Inc., December 4, 1951, pages 264 and 265. (Copy in Div. 51.)